(12) United States Patent
Robinson et al.

(10) Patent No.: US 11,575,759 B1
(45) Date of Patent: Feb. 7, 2023

(54) ASSOCIATING DEVICE WITH USER ACCOUNT AND ESTABLISHING CONNECTION TO A DATA NETWORK

(71) Applicant: Amazon Technologies, Inc., Seattle, WA (US)

(72) Inventors: Quentin N. Robinson, Springfield, NJ (US); Anubhab Sagar Kolay, Bellevue, WA (US); Thomas Friederich, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/474,426

(22) Filed: Sep. 14, 2021

(51) Int. Cl.
| | |
|---|---|
| *H04L 67/141* | (2022.01) |
| *H04W 4/80* | (2018.01) |
| *G06F 3/16* | (2006.01) |
| *H04L 67/306* | (2022.01) |
| *H04W 76/11* | (2018.01) |

(52) U.S. Cl.
CPC ............ *H04L 67/141* (2013.01); *G06F 3/167* (2013.01); *H04L 67/306* (2013.01); *H04W 4/80* (2018.02); *H04W 76/11* (2018.02)

(58) Field of Classification Search
CPC ...... H04L 67/141; H04L 67/306; H04W 4/80; H04W 76/11; G06F 3/167
See application file for complete search history.

(56) References Cited

U.S. PATENT DOCUMENTS

| | | | |
|---|---|---|---|
| 8,832,805 B1* | 9/2014 | McGilliard | H04L 63/10 726/28 |
| 10,050,960 B1* | 8/2018 | Czeskis | H04H 20/38 |
| 11,336,652 B2* | 5/2022 | Warrick | H04L 63/102 |
| 2013/0111550 A1* | 5/2013 | Naveh | H04L 63/102 709/217 |
| 2017/0208129 A1* | 7/2017 | Maguire | H04W 52/0245 |
| 2017/0346820 A1* | 11/2017 | Valla | H04W 4/021 |
| 2017/0353859 A1* | 12/2017 | Idnani | H04W 12/08 |
| 2020/0092701 A1* | 3/2020 | Arnberg | H04M 1/72415 |
| 2020/0274868 A1 | 8/2020 | Passaglia et al. | |

* cited by examiner

*Primary Examiner* — Jonathan A Bui
(74) *Attorney, Agent, or Firm* — Kilpatrick Townsend & Stockton LLP

(57) ABSTRACT

Techniques for connecting computing devices to a network are described. For example, a computer system receives, from a second device that is associated with an account and connected to a data network, first data indicating an identifier of a first device. The computer system determines that the identifier is unassociated with accounts that include the account. The computer system determines second data associated with the identifier, access to the account, or a device setup request. The computer system determines that the first device is to be associated with the account. The computer system sends, to a third device, third data that causes the third device to output a confirmation request about setting up the first device and receives, from the third device, fourth data indicating a response to the confirmation request. The computer system associates the first device with the account based on the fourth data.

20 Claims, 10 Drawing Sheets

ASSOCIATING DEVICE WITH USER ACCOUNT AND ESTABLISHING CONNECTION TO A DATA NETWORK

BACKGROUND

Most computing devices, such as consumer electronics, support wireless connectivity. Typically, a computing device connects to a wireless access point that provides access to a data network. In many cases, functionalities of the device through the data network become available only after the device is registered with a user account and is connected to the data network. Typically, the registration and connection process involves many user input steps to identify the device, the user account, and the data network.

DETAILED DESCRIPTION

Figure 1:
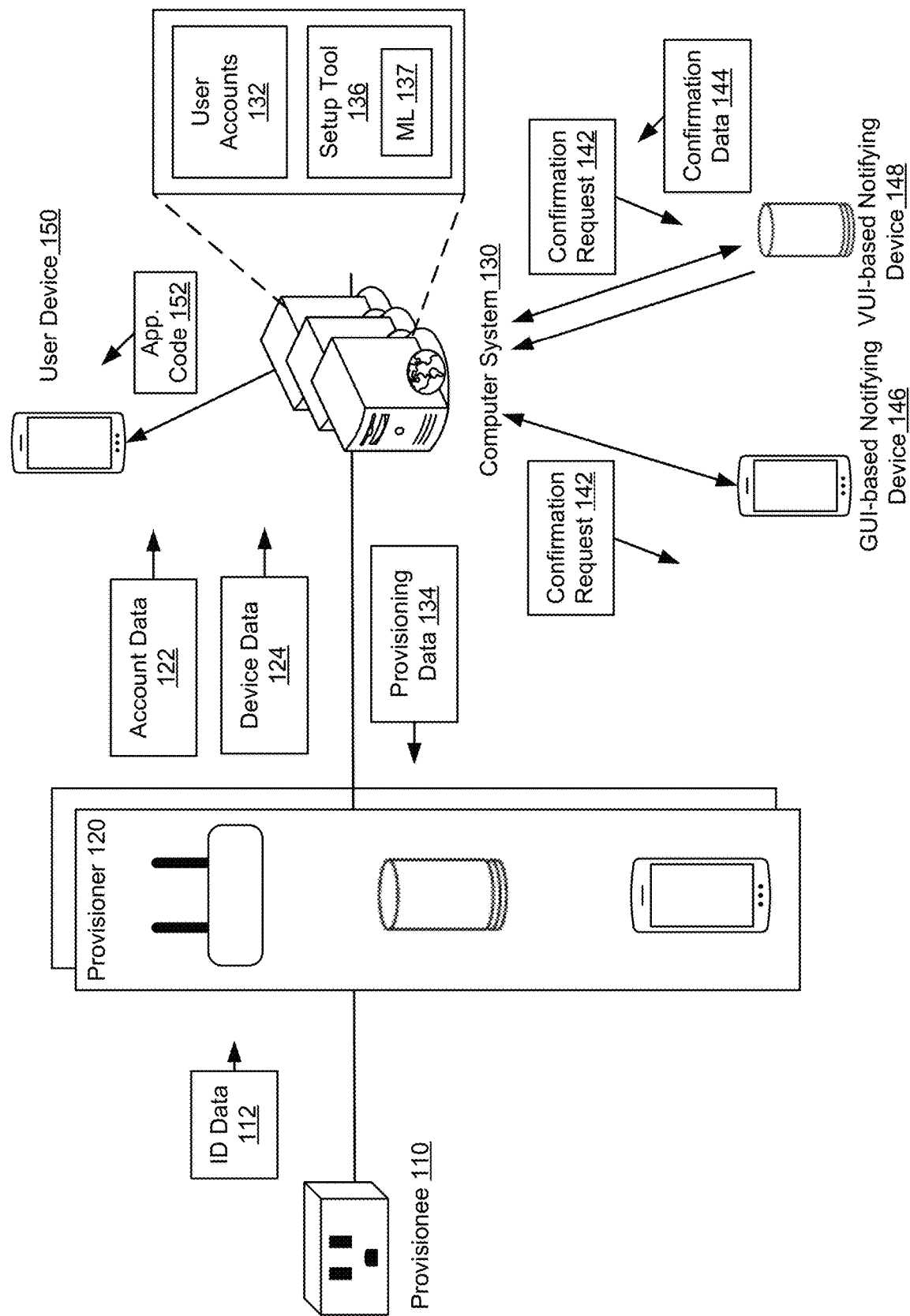
FIG. 1 illustrates an example of associating a device with a user account to establish connection to a data network, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified to not obscure the embodiment being described.

Embodiments of the present disclosure are directed to, among other things, associating a device with a user account and establishing connection to a data network based on the association. In the interest of clarity, such a device is referred to herein as a provisionee. Once the association is complete, functionalities of the provisionee become available through the data network. In an example, the data network includes one or more devices. At least one of such devices has a data connection with a computer system. In the interest of clarity, such a device is referred to herein as a provisioner. The provisionee generates a signal broadcast, such as a BLUETOOTH advertisement beacon, that is received by the provisioner. The provisioner determines identification data about the provisionee and send the identification data, along with a received signal strength indication (RSSI) of the signal broadcast, to the computer system. Based on the identification data, RSSI, and account data (e.g., an access to a user account, a request for a device setup page from an application executed on a device associated with a user account, a determination of a device setup intent based on user utterance audio received a device associated with the user account), the computer system determines a user account to be associated with the provisionee. The computer system then sends data to a device associated with the user account to cause the device to output a confirmation request. Upon receiving confirmation data in response to the confirmation request, the computer system associates the provisionee with the user account. The computer system can then provide a credential to the provisioner for the data network, and the provisioner can provide the credential to the provisionee so that the provisionee can join the data network.

To illustrate, consider an example of a secure home network that includes an access point and multiple first devices associated with a first user account. Upon a first power ON of a new smart plug, the smart plug begins sending a signal broadcast as a BLUETOOTH advertisement beacon periodically. The signal broadcast includes a device identifier for the smart plug. One or more of the first devices detect the signal broadcast and send the device identifier to a computer system. The one or more first devices also send a received signal strength indication (RSSI) of the signal broadcast to the computer system. Second devices connected to a second network, associated with a second user account, and within the range of the signal broadcast can also receive the BLUETOOTH advertisement beacon and send similar data to the computer system. Based on the device identifier, the computer system determines that the smart plug is not associated with the first user account, the second user account, or any user account accessible to the computer system. Additionally, the computer system may determine that a user associated with the first user account has recently requested a device setup page from an application on one of the devices. The device identifier, RSSI, and setup request data (e.g., type of the request, timing of the request, etc.) can be input to a machine learning (ML) model that outputs a first likelihood of the smart plug being associated with the first user account and, similarly, a second likelihood of the association with the second user account. If the first likelihood is larger than the second likelihood and exceeds a threshold, the computer system sends a confirmation request to a device associated with the first user account to confirm that the smart plug is to be set up in association with the first user account. Upon receiving a confirmation back, the computer system includes the device identifier in information of the first user account. Additionally, the computer system sends a service set identifier (SSID) and credential of the access point to one of the first devices, along with instructions to respond to the signal broadcast (e.g., in a BLUETOOTH response) or connect to the smart plug (e.g., via BLUETOOTH pairing) such that the SSID and credential can be passed to the smart plug. The smart plug then uses this information to connect to the access point and join the secure home network.

Embodiments of the present disclosure may provide technical improvements over conventional techniques for setting up a data connection. For example, this process may be performed automatically with minimal user input (e.g., which can involve a mere confirmation of a device setup in association with a user account). In particular, once the provisionee is associated with a user account associated with a credential of the secure data network, the user may merely need to power ON the provisionee and confirm the setup for this device join a secure data network. This process is scalable by enabling the automatic setup of multiple devices, while also being secure. In particular, the computer system triggers the provisioning of the connection to the secure data network only upon determining proper ownership or control over the provisioner (e.g., via the confirmation step).

FIG. 1 illustrates an example of associating a device with a user account to establish connection to a data network, according to embodiments of the present disclosure. As illustrated in FIG. 1, a provisionee 110, which is an example of a first device, requests registration such that the control over the provisionee 110 can be effectuated remotely from one or more other devices. In FIG. 1, the provisionee 110 is illustrated as a smart plug. Of course, the embodiments of the present disclosure similarly apply to any other type of user devices including internet of things (IoT) devices, such as a smart speaker, a smart appliance, a smart control system (e.g., a thermostat), a smart set top box, a smart television, a smart sensor, and the like. Upon a registration trigger event (e.g., the first time the provisionee 110 is powered on or connected to a home network, or upon a local determination that no registration has been performed yet, or some other event), the provisionee 110, among other things, sends identification (ID) data 112 to a second device, illustrated in FIG. 1 as a provisioner 120. The ID data 112 includes information about the provisionee 110, such as the type of the provisionee 110 and/or an identifier of the provisionee 110 (e.g., a product identifier such as its stock keeping unit (SKU), a serial number, a public key of the provisionee 110, or a hash of the public key). The ID data 112 can be included in a beacon sent to the provisioner 120 in, for example, a broadcast signal. For example, the beacon can be a Wi-Fi beacon a BLUETOOTh beacon, a Zigbee beacon, or an audio beacon.

The provisioner 120 can be any type of a device that is on a home network, that is already associated (e.g., registered) with a user account, and that has a data connection to a computer system 130. For instance, the provisioner 120 can be an access point, a smart speaker, a mobile phone, a personal computer, or any other user device. The provisioner 120 sends device data 124 that includes the information about the provisionee 110 to the computer system 130. The device data 124 can correspond to the ID data 112 (e.g., includes the same information). The device data 124 can additionally include a received signal strength indication (RSSI) of the beacon. Sending the device data 124 can include forwarding the beacon, or as applicable, repackaging the information in the beacon into another format suitable for the data connection between the provisioner 120 and the computer system 130 (e.g., from a BLUETOOTH beacon to an internet protocol (IP) packet(s)). In the interest of clarity, the description herein refers to a provisioner that receives the signal broadcast of the provisionee. However, as illustrated in FIG. 1, multiple provisioners associated with the user account, on the home network, and connected to the computer system 130 can likewise receive the signal broadcast and communicate the relevant data to the computer system 130. In addition, there can be different provisioners associated with a different user account and these provisioners can be on a different data network and connected to the computer system 130.

The computer system 130 also receives account data 122, which may be received from the provisioner 120, a remote computer system (e.g., a first party system, or a third party system), or another device. The account data 122 includes data about the user account associated with the provisioner 120. In one example, the account data 122 can relate to a context associated with accessing the user account. In this example, the account data 122 can indicate one or more of an access to the user account, a request for a device setup page from an application executed on a device associated with the user account, or a determination of a device setup intent based on user utterance audio received by a device associated with the user device. The account data 122 can also indicate a timing associated with each of the actions. In an additional or alternate example, the account data 122 can relate to a context associated with other parameters that may be stored for the user account. For instance, the computer system 130 may receive, from a remote computer system (e.g., a first party system, or a third party system), data indicating a purchase, shipment, and/or delivery (expected, scheduled, or actual) of a new device. Such data can be stored in association with the user account. The timing of the purchase, shipment, and/or delivery can be indicated in the account data 122. Hence, in this example, when the provisioner 120 sends, at a particular time, the device data 124 identifying the provisionee 110, and when the account data 122 indicates an expected new device delivery date, the computer system 120 may use both types of data to determine a relatively higher likelihood of associating the provisionee 110 with the user account when, for instance, the expected new device delivery date is within a time window of the particular time (e.g., the day before).

The computer system 130 can determine that the identifier in the device data 124 is unassociated with any of user accounts 132 that are accessible to the computer system 130. In response, the computer system 130 uses information about the user accounts 132 and a setup tool 136 to determine a user account of the user accounts 132 to be associated with the provisionee 110. The setup tool 136 includes a machine learning (ML) model 137 that receives the device data 124 and the account data 122 to determine the most likely user account that is to be associated with the provisionee 110. For example, the ML model 137 outputs a likelihood of the provisionee 110 being associated with each user account based on the device data 124. The likelihood may be updated over time as additional data is received. For example, at a first time, the device data 124 may be available to the computer system 130, so the ML model 137 can determine the likelihood based on the device data 124. After some time, the account data 122 can be received, and an updated likelihood can be generated based on the account data 122. Based on the output of the ML model 137, the computer system 130 selects a user account to be associated with the provisionee 110 (e.g., the user account for which the largest likelihood is determined, where this likelihood can be compared to a set of predefined likelihood thresholds).

If the provisionee 110 is of a particular type (e.g., a garage door opener or security system component), which can be determined from metadata from a manufacturer of the provisionee 110, the computer system 130 may determine that a code entry is needed to proceed with setting up the provisionee 110. A code entry may additionally be determined to be needed if the likelihood of the provisionee 110 being associated with the user account is between an upper likelihood threshold and a lower likelihood threshold.

In an example, the computer system 130 determines one or more notifying devices associated with the user account to send a confirmation request 142. The confirmation request 142 can be for setting up the provisionee 110 with the user account. For example, as illustrated in FIG. 1, the confirmation request 142 may be sent to a GUI-based notifying device 146, such as a mobile phone, and/or to a VUI-based notifying device 148, such as a smart speaker. In some instances, the device that receives the confirmation request 142 may be the provisioner 120. The computer system 130 may select a device that includes an application associated with the provisionee 110 to be the notifying device. If multiple devices have a same UI capability, the computer system 130 may select the device associated with a higher RSSI for the device data 124 to be the notifying device. Alternatively, the computer system 130 may select a device associated with a most recent access to the user account, a device associated with a request for a device setup page, or a device associated with of a device setup intent based on user utterance audio to be the notifying device.

A user can then provide a response via one of the devices that receives the confirmation request 142. For example, the user can respond via the VUI-based notifying device 148, which can send confirmation data 144 indicating a response confirming the setting up of the provisionee 110 to the computer system 130. The computer system can present an indication to the VUI-based notifying device 148, and not the GUI-based notifying device 146, that the provisionee 110 is being setup based on receiving the confirmation data 144 from the VUI-based notifying device 148. If a code entry is needed, the code (e.g., digits of the serial number) can be entered at the VUI-based notifying device 148, or at the provisionee 110. The code may be static (e.g., printed on the provisionee 110 or included in the packaging of the provisionee 110). The code may additionally or alternatively be dynamic and generated by the computer system 130 and then sent to the VUI-based notifying device 148, the provisioner 120, or the provisionee 110. The code can be entered at one of the other devices and sent to the computer system 130 to verify the match between the code sent and the code received. If the codes match, the computer system 130 then associates the provisionee 110 with the user account by including some or all of the ID data 112 in information of the user account.

The computer system 130 then sends provisioning data 134 to the provisioner 120. If the computer system 130 received device data from multiple devices, the computer system 130 can select a device to be the provisioner 120. The computer system 130 may select a device based on a timing of the device data received from each device. A device associated with a more recent receipt of the device data may be selected as the provisioner 120. Alternatively, a device associated with a higher RSSI of the signal broadcast from the provisionee 110 may be selected as the provisioner 120. The device selected can be sent the provisioning data 134, while the device(s) not selected may be sent data indicating that they are to ignore the signal broadcast of the provisionee 110. The provisioning data 134 indicates a credential of the access point and that the provisioner 120 is to provide the credential to the provisionee 110. The credential can include an SSID and a passphrase to join the home network. The provisionee 110 connects to the access point and joins the home network based on the credential.

In some instances, the computer system 130 sends data to the GUI-based notifying device 146 or the VUI-based notifying device 148 that causes the notifying device to output a notification about downloading an application that is associated with a computing service of the provisionee 110. The computer system 130 can receive data indicating that an application download is requested for the application. The computer system 130 can then send application code 152 to a user device 150 associated with the user account to cause a download of an instance of the application. The user device 150 may be the same or different from the GUI-based notifying device 146 or the VUI-based notifying device 148. The instance of the application is configured based on information from the user account (e.g., user settings and account settings of this instance can be derived from the information of the user account and presented in the instance for user confirmation).

While the provisioner 120, the GUI-based notifying device 146, the VUI-based notifying device 148, and the user device 150 are all shown as different devices in FIG. 1, each of these components may be the same device in other examples. Alternatively, any combination of these components may be possible. For example, provisioner 120 may be the user device 150, but not the VUI-based notifying device 148.

Figure 2:
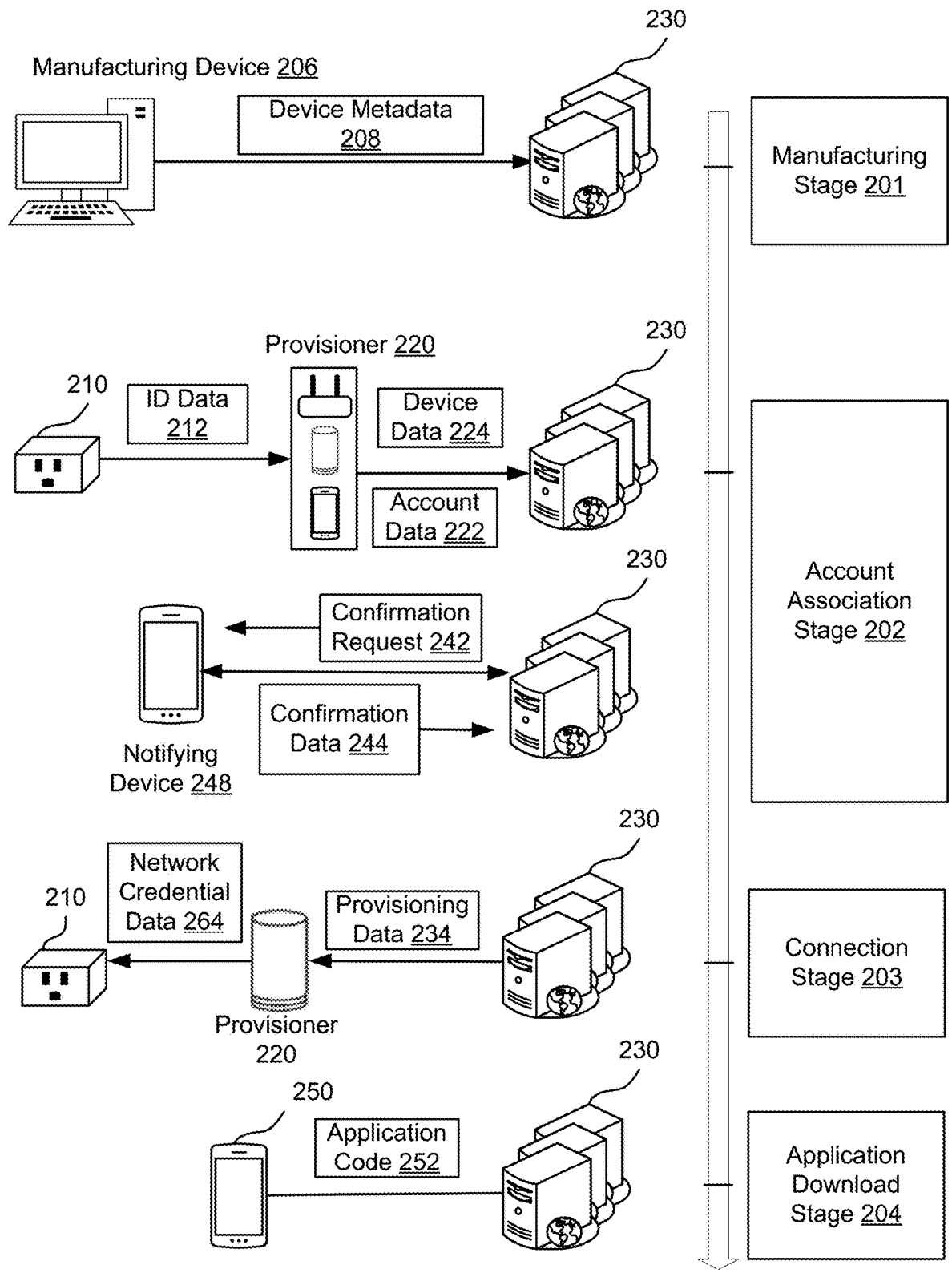
FIG. 2 illustrates an example of stages of associating a device with a user account to establish connection to a data network, according to embodiments of the present disclosure.

FIG. 2 illustrates an example of stages of associating a device with a user account to establish connection to a data network, according to embodiments of the present disclosure. As illustrated, the stages include a manufacturing stage 201, an account association stage 202, a connection stage 203, and an application download stage 204.

In an example, during the manufacturing stage 201, a manufacturing device 206, such as a computer system associated with a manufacturer of a device, sends device metadata 208 to a computer system 230. The computer system 230 can be an example of the computer system 130 in FIG. 1. The device metadata 208 includes a device ID (e.g., a hash of a public key of the device), a serial number of the device, and a device type of the device (e.g., camera, sensor, smart plug, etc.).

During the account association stage 202, a provisionee 210 is associated with a user account. The provisionee 210 can be the device associated with the device metadata 208 received in the manufacturing stage 201. The provisionee 210 sends a signal broadcast with ID data 212 including the device ID and other information about the provisionee 21. A provisioner 220 receives the signal broadcast (or multiple provisioners depending on type the signal broadcast, the transmitting range of the provisionee 210, device locations, and reception capabilities of possible provisioners). The provisioner 220 sends the ID data 212, along with an RSSI of the signal broadcast, to the computer system 230 as device data 224. The computer system 230 also receives account data 222 indicating one or more of an access to the user account, a request for a device setup page from an application executed on a device associated with the user account, a determination of a device setup intent based on user utterance audio received by a device associated with the user device, a device purchase associated with the user account, a device shipment associated with the user account, and/or a device delivery (actual, expected, or scheduled) associated with the user account.

The computer system 230 uses the device data 224 and the account data 222 to determine a user account to associate with the provisionee 210. For example, the computer system 230 can input the device data 224 and the account data 222 to a ML model that outputs a likelihood of a user account being associated with the provisionee 210. The computer system 230 can then select the user account associated with the highest likelihood. Configurations other than using an ML model are possible. For instance, the computer system 230 may receive data from multiple provisioners about the provisionee 210. Each provisioner can be associated with a user account. The computer system 230 can determine a user account that is associated with a highest number of the provisioners, and select that user account as the user account that is to be associated with the provisionee 210.

The computer system 230 also determines a notifying device 248 to output a confirmation request 242 for setting up the provisionee 210. The notifying device 248 is a device that is associated with the user account and may have graphical user interface capability or voice user interface capability. In some instances, the notifying device 248 may be the provisioner 220. The computer system 230 sends the confirmation request 242 to the notifying device 248 to be output by the notifying device 248. The notifying device 248 then receives confirmation data 244 indicating a response to the confirmation request 242 for setting up the provisionee 210. The notifying device 248 sends the confirmation data 244 to the computer system 230, and the computer system 230 associates the provisionee 210 with the user account by including the device ID in information of the user account. If the confirmation data 244 indicates that the provisionee 210 is not to be setup, the computer system 230 enters a manual setup process.

During the connection stage 203, the computer system 230 has already associated the provisionee 210 with the user account. The computer system 230 then triggers an automatic process to enable the provisionee 210 to join a secure data network (e.g., a home network such as a secure local area network (LAN) protected with a credential) by establishing a data connection to the secure data network. Once connected, the provisionee 210, the provisioner 220, or any other device on the secure data network (e.g., an access point) can send an indication to the computer system 230 that the provisionee 210 joined the secure data network.

The connection stage 203 may involve a server-based setup, as described in U.S. patent application Ser. Nos. 16/165,835, 16/285,934, 16/452,193, and 16/682,230, which are incorporated by reference. The server-based setup allows a wireless connection to be established in a secure manner and without user input at the provisionee 210 and/or another device of the secure data network during the setup process. In an example, the provisionee 210 establishes a data connection with the provisioner 220, such as a wireless access point, over a different data network (e.g., a hidden open network). This provisioner 220 can manage data communications between the provisionee 210 and the computer system 230. In particular, outbound data traffic from the provisionee 210 is received by the provisioner 220 over the different data network and sent to the computer system 230. Inbound data traffic to the provisionee 210 is received by the provisioner 220 from the computer system 230 and transmitted to the provisionee 210 over the different data network. The data communications involve an exchange of certificates between the provisionee 210 and the computer system 230 for mutual authentication. In addition, the computer system 230 further authenticates the provisionee 210 based on an existing association between the provisionee 210 and the user account. Similarly, the provisionee 210 further authenticates the computer system 230 based on a digital signature, where this digital signature is received as part of the data communication. Once authentication is complete, the provisionee 210 can request from the computer system 230, via the provisioner 220, a credential of the secure data network. Upon determining that an identifier of the secure data network and its credential are associated with the user account, the computer system 230 sends the credential to the provisionee 210, via the provisioner 220. In turn, the provisionee 210 establishes a data connection with an access point of the secure data network by using the credential, thereby connecting to the secure data network. Other variations exist. For example, rather than using a hidden, open network, BLUETOOTH, Wi-Fi, or Zigbee links can be established between the provisioner 220 and the provisionee 210 to pass any data from the computer system 230 to the provisionee 210 via the provisioner 220 and, conversely, from the provisionee 210 to the computer system 230 via the provisioner 220, until the provisionee 210 joins the secure data network. The data exchange can include authentication data, validation data, and credential data as described herein above.

During the application download stage 204, the computer system 230 sends application code 252 to a user device 250 associated with the user account to download an application associated with the provisionee 210. In some instances, the user device 250 may be the notifying device 248. The notifying device can output a notification about downloading the application. For example, if the notifying device is a VUI-based device, it can output audio indicating a user is to check a mobile phone associated with the user account to download the application. Generally, the provisionee 210 can be associated with an application to be downloaded as the application code 252. The computer system 230 determines one or more of the user devices registered under the user account as the user device 250 to receive the application code 252. This determination can be based on a user device capability, download requirements (e.g. memory space, operating system type, etc.) of the application, user preferences, history of downloads of other applications, and the like.

Figure 3:
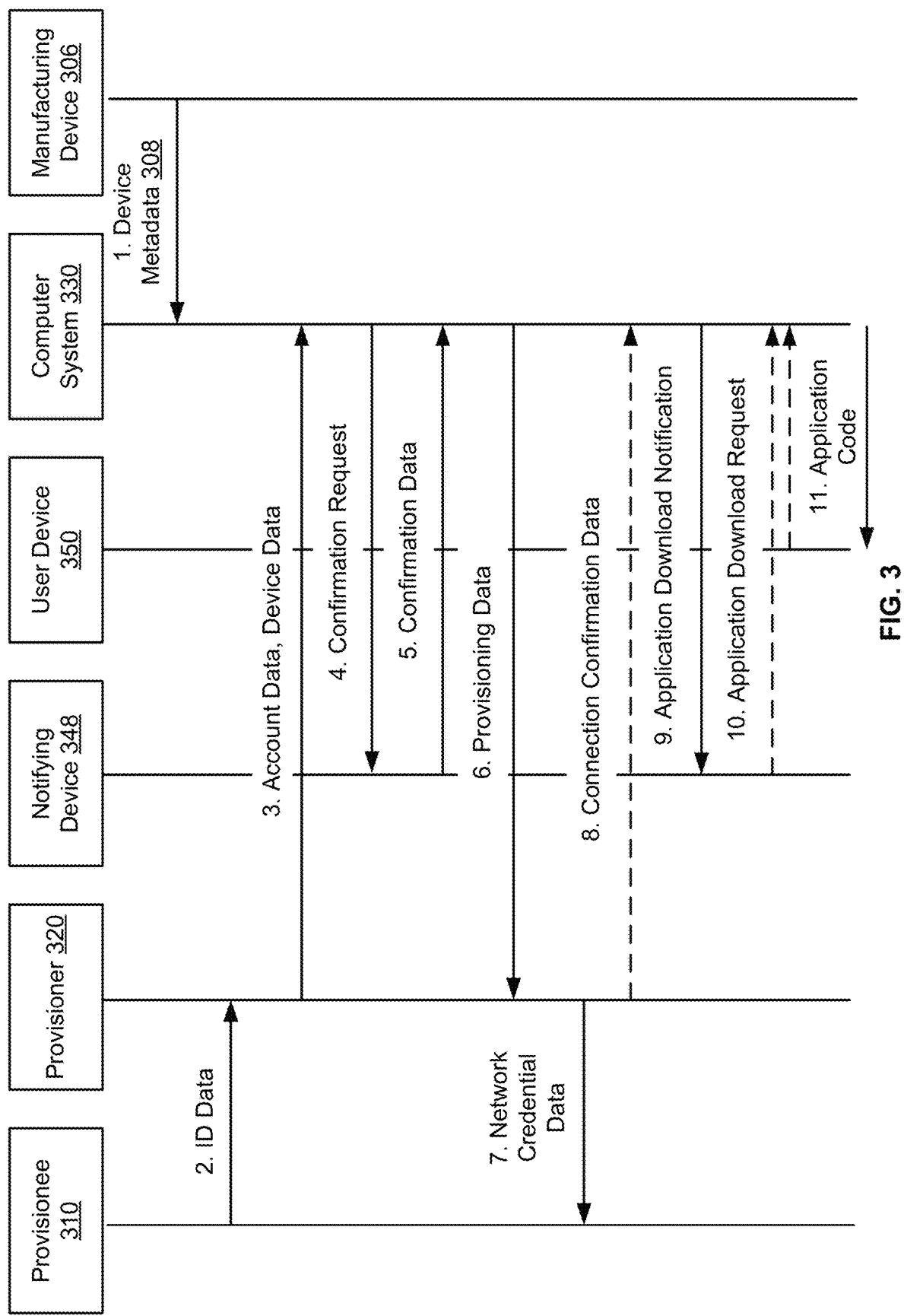
FIG. 3 illustrates an example a diagram for establishing a connection to a data network by associating a device with a user account, according to embodiments of the present disclosure.

FIG. 3 illustrates an example a diagram for establishing a connection to a data network by associating a device with a user account, according to embodiments of the present disclosure. A provisionee 310 is not associated with a user account yet. As illustrated with the first step, manufacturing device 306 sends device metadata 308 to a computer system 330, which is an example of the computer system 130 in FIG. 1. The device metadata 308 can include identification information about the provisionee 310, such as a device ID, a serial number, and a device type.

Beaconing, or any other type of signal broadcast, is started by the provisionee 310 and different types of beaconing are supported (BLUETOOTH and Wi-Fi are some beaconing types listed, but the present disclosure is not limited to these modes). The provisionee 310 starts beaconing and sending ID data as illustrated with the second step. The provisioner 320 receives these as beacons and provides, as illustrated with the third step, the device data to the computer system 330. The provisioner 320 also provides account data associated with the provisioner 320 to the computer system 330. Here, the account data identifies the user account with which the provisioner 320 is associated. Other types of account data are also possible depending on user activity at the provisioner 320 (e.g., the account data can include a web request to set-up or register a new device).

The computer system 330 determines a user account to be associated with the provisionee 310 and sends a confirmation request to a notifying device 348 associated with the user account as illustrated with the fourth step. The notifying device 348 confirms the provisionee 310 is to be associated with the user account and sends confirmation data to the computer system 330 as illustrated with the fifth step. The computer system 330 provides provisioning data to the provisioner 320 indicating a credential of an access point of a data network as illustrated with the sixth step. The provisioner 320 sends network credential data to the provisionee 310 that the provisionee 310 uses to connect to the access point and join the network as illustrated with the seventh step. In some instances, the provisioner 320 provides connection confirmation data indicating the provisionee 310 has been added to the network to the computer system 330 as illustrated with the eighth step.

With the provisionee 310 connected to the network, the computer system 330 determines that there is an application associated with the provisionee 310 and sends an application download notification to the notifying device 348 to indicate that an instance of the application should be downloaded to the user device 350 as illustrated with the ninth step. In some instances, the notifying device 348 or the user device 350 sends an application download request to the computer system 330 to confirm that the application is to be downloaded to the user device 350 as illustrated with the tenth step. The computer system 330 sends application code to the user device 350 to add the instance of the application to the user device 350 as illustrated with the eleventh step.

FIGS. 4-8 illustrate examples of flow for associating a user account with a device for establishing a data network connection. Operations of the flow can be performed by a computing system, such as the computer system 130. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

Figure 4:
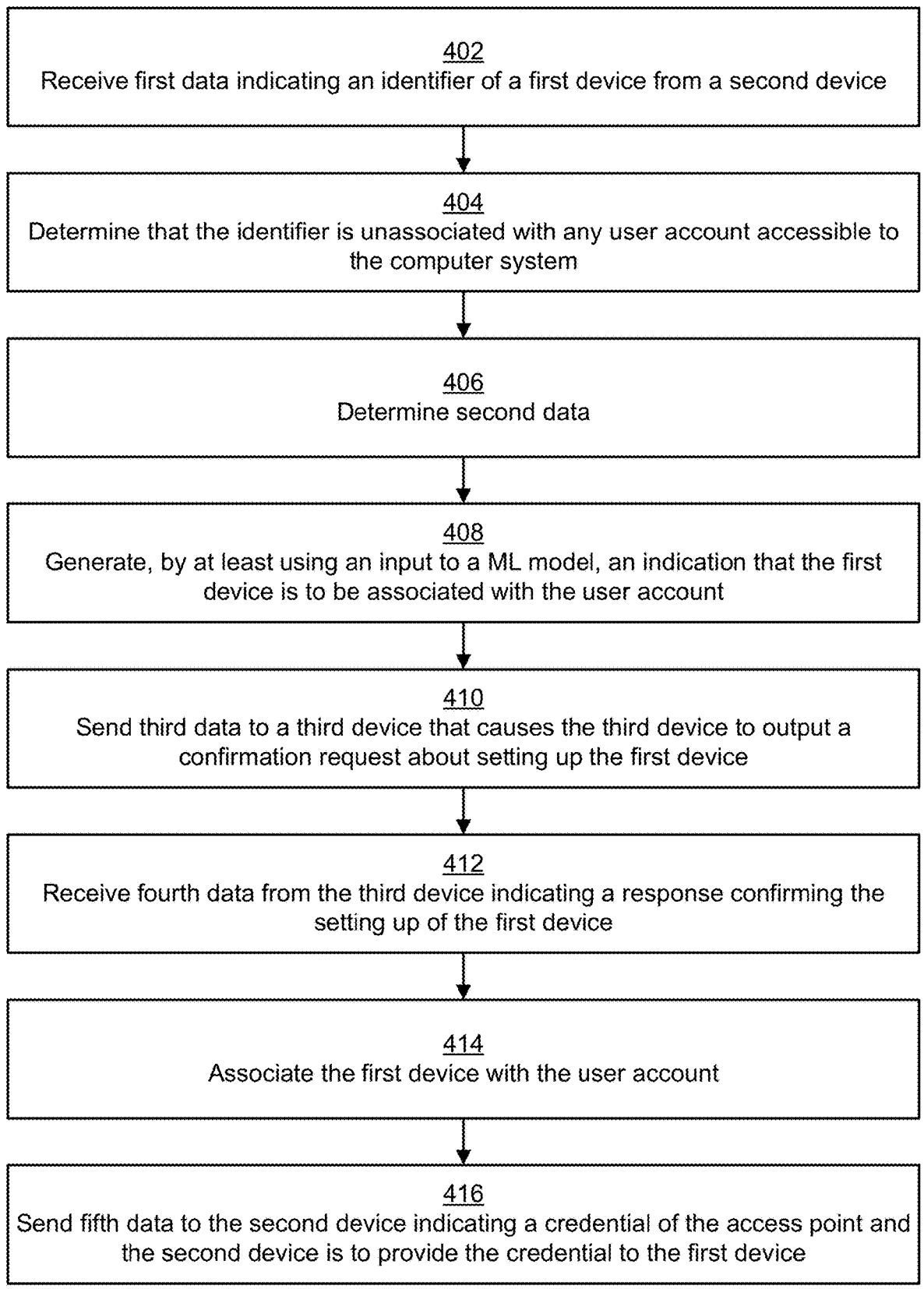
FIG. 4 illustrates an example of a flow for associating a device with a user account to establish connection to a data network, according to embodiments of the present disclosure.

FIG. 4 illustrates an example of a flow for associating a device with a user account to establish connection to a data network, according to embodiments of the present disclosure. In an example, the flow includes operation 402, where the computer system receives first data indicating an identifier of a first device from a second device. The first device can be a provisionee, such as the provisionee 110, and the second device can be a provisioner, such as the provisioner 120, and can be associated with a first user account and connected to a first data network. The provisioner 120 can receive the identifier in a signal broadcast, such as a BLUETOOTH advertisement beacon. The first device can be unassociated with a user account that other devices are associated with, including the first user account.

In an example, the flow includes operation 404, where the computer system determines that the identifier is unassociated with any user account accessible to the computer system (or, at least the first user account and any other user account associated with a device from which the identifier of the first device is received). The computer system can compare the identifier to device identifiers associated with user accounts accessible to the computer system to determine that the identifier is unassociated with a user account. In an illustration, the computer system can check the identifier against all user accounts accessible to the computer system. In another illustration, the computer system can check the identifier against only the user accounts associated with the provisioners from which the identifier is received. In a further illustration, the computer system can manage a plurality of user accounts and check the identifier against a subset of these user accounts. For instance, the subset identifies the user accounts associated with the provisioners from which the identifier is received. These user accounts are also associated with a geographic region (e.g., a city, a zip code, etc.). Other user accounts that are associated with the geographic region are also determined and are identified in the subset.

In an example, the flow includes operation 406, where the computer system determines second data. The second data is associated with at least one of the identifier, access to the first account associated with the second device, or a device setup request. For example, the second data can indicate at least one of an access to the first account associated with the second device, a request for a device setup page from an application executed on one of the devices associated with the account, or a determination of a device setup intent based on user utterance audio received by the one of the devices associated with the account. The second data may be received from the second device, or from a remote device that stores the second data.

In an example, the flow includes operation 408, where the computer system generates, by at least using an input to a ML model, an indication that the first device is to be associated with the user account. The ML model can determine a likelihood of a user account being associated with the first device, and the indication can indicate the first user account associated with the highest likelihood. As explained herein above, an ML model may not be used. For instance, the computer system may receive first data from multiple devices, determine the user accounts associated with these devices, track per user account the number of devices from which the first data is received, creating a ratio per user account of this number over the total number of user devices associated with the account, and select the first user account for association with the first device upon determining that its ratio is the largest.

In an example, the flow includes operation 410, where the computer system sends third data to a third device that causes the third device to output a confirmation request about setting up the first device. The third device may be the same or different from the second device. Additionally, the third device can include voice user interface capability or graphical user interface capability. In some instances, the computer system can send third data to multiple devices to output the confirmation request.

In an example, the flow includes operation 412, where the computer system receives fourth data from the third device indicating a response confirming the setting up of the first device. The response may be a response input by a user at a GUI of the third device, or a user utterance to the third device, confirming that the first device is to be associated with the user account.

In an example, the flow includes operation 414, where the computer system associates the first device with the user account. The computer system can include the identifier in information of the user account.

In an example, the flow includes operation 416, where the computer system sends fifth data to the second device indicating a credential of the access point and the second device is to provide the credential to the first device. The credential can be an example of the provisioning data 134 in FIG. 1. The second device can then send the credential to the first device, which connects the first device to the access point and joins the first device to the home network.

Figure 5:
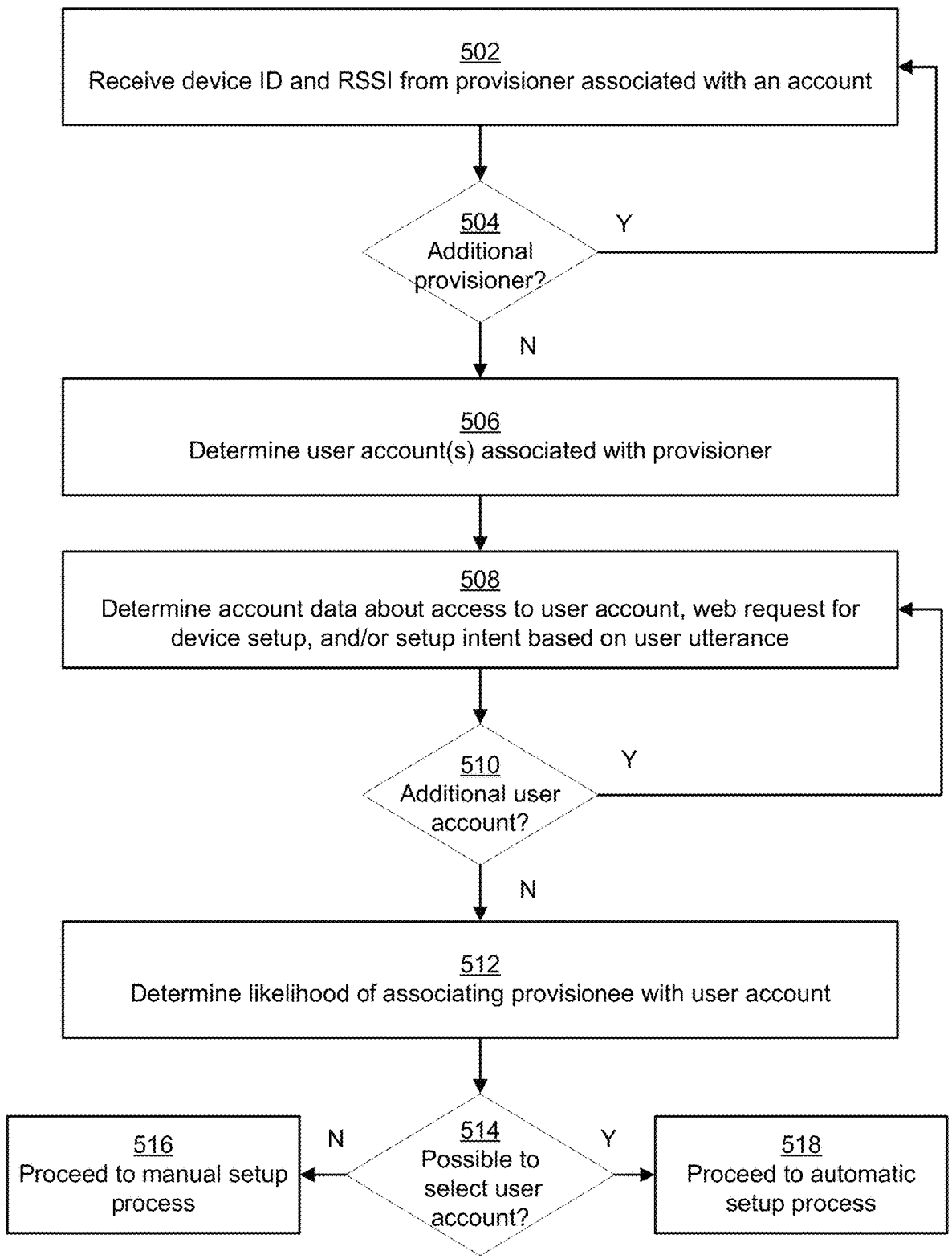
FIG. 5 illustrates an example of a flow for selecting a user account to be associated with a device, according to embodiments of the present disclosure.

FIG. 5 illustrates an example of a flow for selecting a user account to be associated with a device, according to embodiments of the present disclosure. In an example, the flow includes operation 502, where the computer system receives a device ID and RSSI from a provisioner associated with an account.

In an example, the flow includes operation 504, where the computer system determines whether there is an additional provisioner. The computer system can determine there is an additional provisioner if the computer system receives the device ID and RSSI from another device. For each provisioner, the computer system receives the device ID and the RSSI. Once there are no additional provisioners, the flow proceeds to operation 506.

In an example, the flow includes operation 506, where the computer system determines user account(s) associated with the provisioner. The computer system can store information about which provisioners are associated with which user account. Each provisioner may be associated with a different user account, or multiple provisioners can be associated with a user account.

In an example, the flow includes operation 508, where the computer system determines account data about an access to the user account, a web request for device setup, a setup intent based on user utterance, a device purchase associated with the user account, a device shipment associated with the user account, and/or a device delivery (actual, expected, or scheduled) associated with the user account. The account data can indicate that a user has attempted to initiate a setup of the provisionee, so the account data may indicate to the computer system a user account that is to be associated with the provisionee.

In an example, the flow includes operation 510, where the computer system determines whether there is an additional user account. The computer system can determine if there is an additional user account based on the user account(s) associated with the provisioner(s). If there is an additional user account, the flow can return to operation 508 to determine account data associated with the additional user account. If the computer system determines there are no additional user accounts, the flow proceeds to operation 512.

In an example, the flow includes operation 512, where the computer system determines a likelihood of associating the provisionee with a user account. The computer system can provide the device ID, RSSI, and the account data to a ML model to determine the likelihood. A user account associated with a provisioner that receives a higher RSSI may be determined to have a higher likelihood than a user account associated with a provisioner that receives a lower RSSI. Additionally or alternatively, a user account associated with a higher number of provisioners may be determined to have a higher likelihood than a user account associated with a lower number of provisioners.

In an example, the flow includes operation 514, where the computer system determines whether it is possible to select a user account. The computer system may determine that a user account can be selected if the likelihood of associating the provisionee with the user account is above a first threshold. Additionally or alternatively, the computer system may determine a user device can be selected if a number of provisioners associated with the user account or the RSSI received by the provisioner is above a threshold. If the computer system can select a user account, the flow proceeds to operation 518. Otherwise, the flow proceeds to operation 516.

In an example, the flow includes operation 516, where the computer system proceeds to a manual setup process. The manual setup process involves a user input manually navigating via a user device and a user account to connect the provisionee to the access point of the network.

In an example, the flow includes operation 518, where the computer system proceeds to an automatic setup process. The automatic setup process involves the computer system sending provisioning data with a credential of the access point to the provisioner. The provisioner sends the credential to the provisionee, and the provisionee uses the credential to connect to the access point and join the network.

Figure 6:
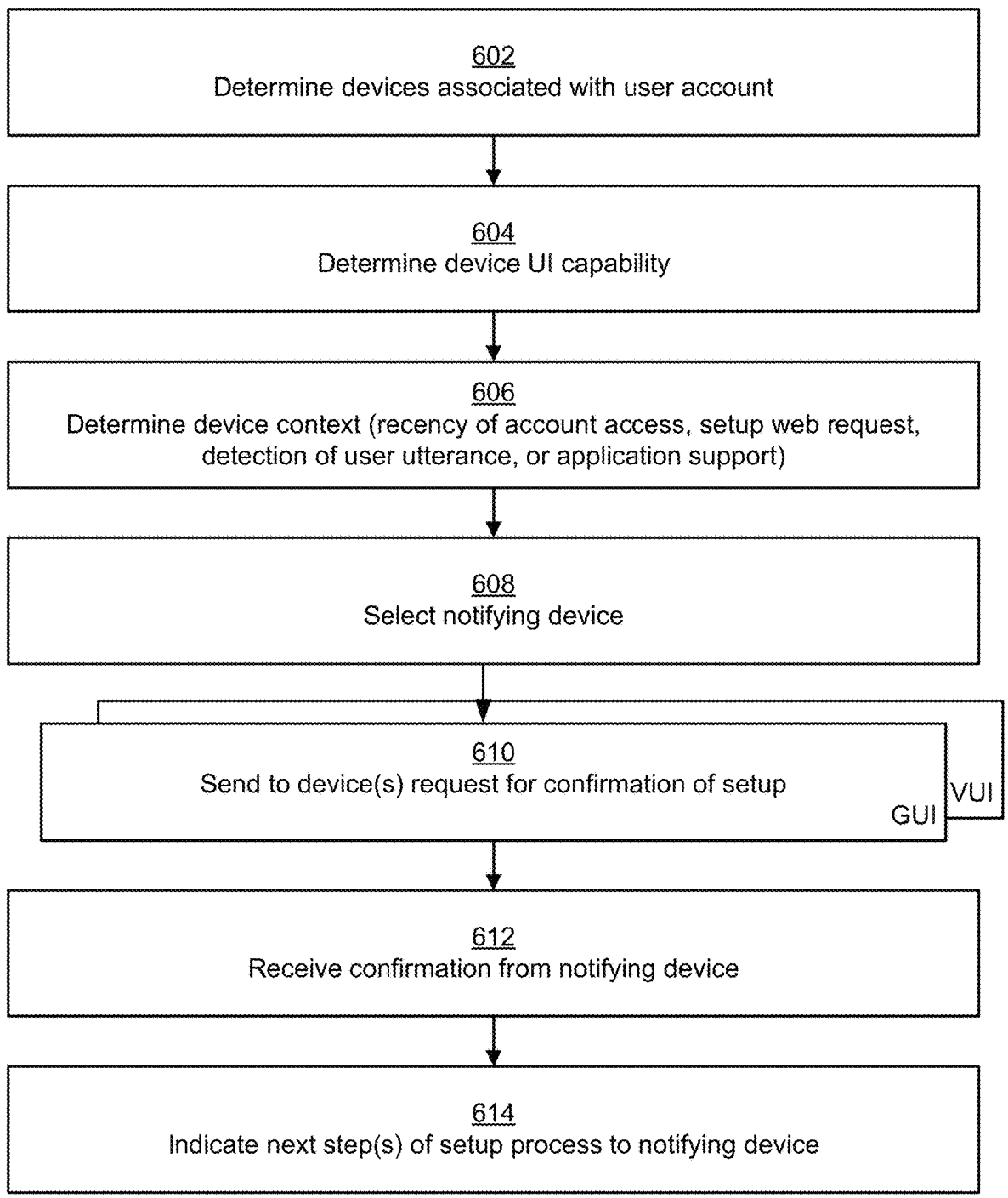
FIG. 6 illustrates an example of a flow for using a notifying device for establishing a connection to a data network, according to embodiments of the present disclosure.

FIG. 6 illustrates an example of a flow for using a notifying device for establishing a connection to a data network, according to embodiments of the present disclosure. In an example, the flow includes operation 602, where the computer system determines devices associated with the user account. The computer system can store information about user accounts and associated devices. The computer system can look up the information to determine devices associated with an account.

In an example, the flow includes operation 604, where the computer system determines device UI capability. Each of the devices may have VUI capability and/or GUI capability. The UI capability of each device may be indicated in the information included in the account.

In an example, the flow includes operation 606, where the computer system determines a device context (e.g., recency of account access, a setup web request, a detection of user utterance, or a presence of an application). The computer system may receive the device context from each device, or another computer system that stores device contexts for each device.

In an example, the flow includes operation 608, where the computer system selects a notifying device. The computer system may select a notifying device based on the UI capability or the device context. For example, the computer system may select a device with a VUI capability and a device with a GUI capability. Alternatively, the computer system may select a device associated with a most recent access to the account, a device associated with a request for a device setup page, or a device associated with a device setup intent based on user utterance audio. Additionally or alternatively, device contexts may be input to an ML model trained to output the selection of the notifying device.

In an example, the flow includes operation 610, where the computer system sends a request to the device(s) for a confirmation of setup. The request can be sent to each of the selected notifying devices.

In an example, the flow includes operation 612, where the computer system receives confirmation from a notifying device. The confirmation can be received through a GUI of a notifying device or through user utterance to a VUI of a notifying device. The confirmation can indicate that a provisionee is to be associated with the user account.

In an example, the flow includes operation 614, where the computer system indicates next step(s) of setup process to the notifying device. The computer system may only send the indication of the next step(s) to the notifying device from which the confirmation was received. The next step(s) may involve a download of an application that is to be initiated by a user.

Figure 7:
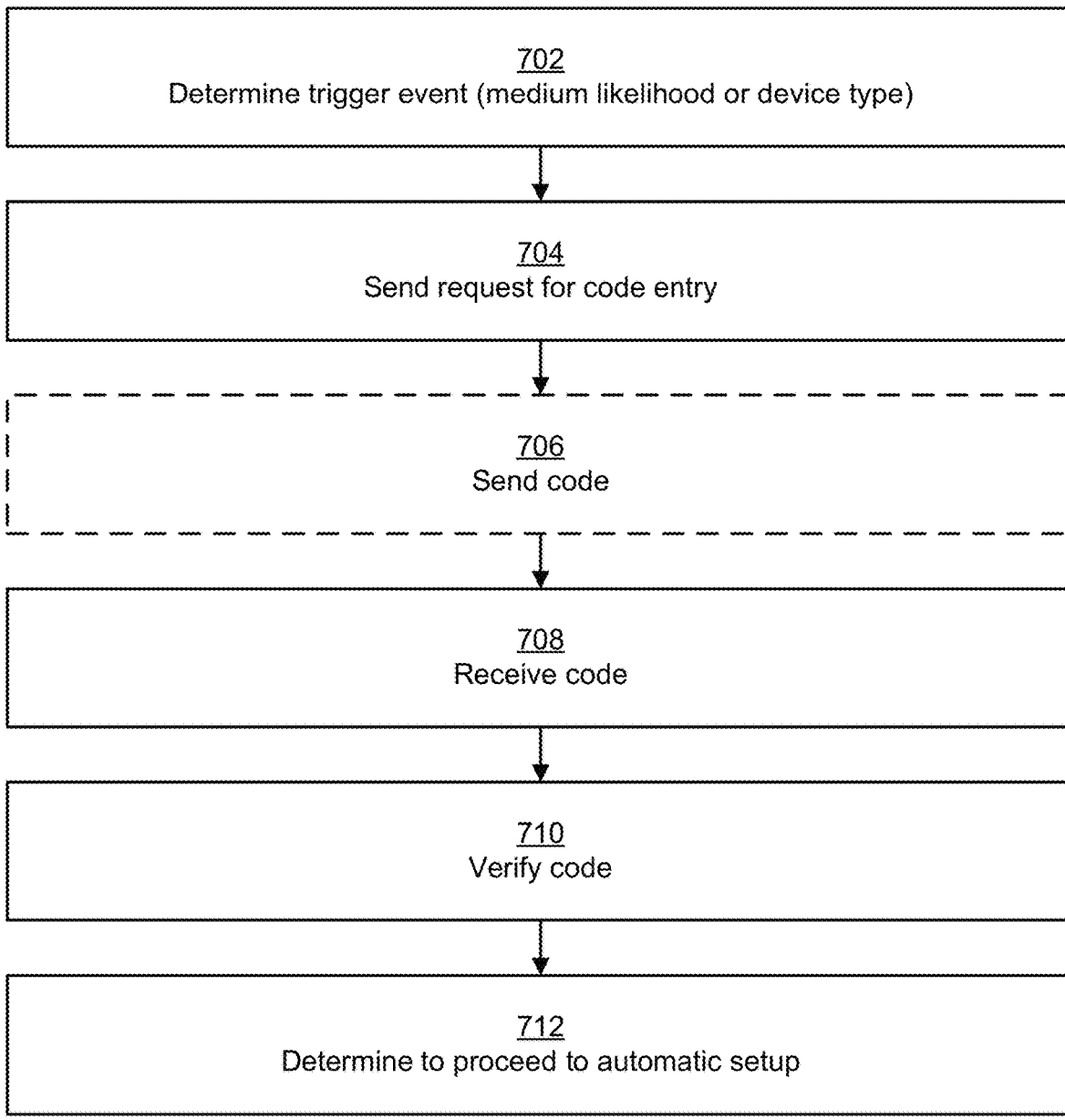
FIG. 7 illustrates an example of a flow for establishing a connection to data network using a code entry, according to embodiments of the present disclosure.

FIG. 7 illustrates an example of a flow for establishing a connection to data network using a code entry, according to embodiments of the present disclosure. In an example, the flow includes operation 702, where the computer system determines a trigger event. The trigger event may be a determination that the provisionee is associated with a device type that is classified as a mission-critical device (e.g., a security system, door lock, garage door opener, etc.). The device type can be determined based on an ID associated with the provisionee and on metadata of the device's manufacturer. Alternatively, the trigger event may be that a likelihood of the user account being associated with the provisionee is between an upper likelihood threshold and a lower likelihood threshold.

In an example, the flow includes operation 704, where the computer system sends a request for code entry. The request can be sent to a notifying device that is associated with the user account. The code may be static or dynamic. If the code is static, the flow proceeds to operation 708. Otherwise, the flow proceeds to operation 706.

In an example, the flow includes operation 706, where the computer system sends the code. The code may be generated by the computer system and sent to the notifying device.

In an example, the flow includes operation 708, where the computer system receives the code. If the code is static, such as the last four digits of the serial number of the provisionee, the code can be input at a UI of the provisionee or the notifying device and then sent to the computer system. If the code is dynamic (e.g., random digits) and presented at the notifying device, the code can then be entered at the provisionee, or vice versa. A limited network connectivity may be used to allow the provisionee to send the code to the computer system. Alternatively, beacons and responses thereto can be exchanged between the provisionee and provisioner such that the provisioner can act as a proxy point for passing data between the computer system and the provisionee.

In an example, the flow includes operation 710, where the computer system verifies the code. If the code is static, the computer system can look-up the ID of the provisionee to determine that the code provided matches the code stored in the metadata associated with the device. If the code is dynamic, the computer system can determine that the code entered at the notifying device or the provisionee matches the code sent by the computer system.

In an example, the flow includes operation 712, where the computer system determines to proceed to automatic setup. If the code is verified, the computer system determines that the user account has been appropriately associated with the provisionee, so the automatic setup of connecting the provisionee to the network can proceed.

Figure 8:
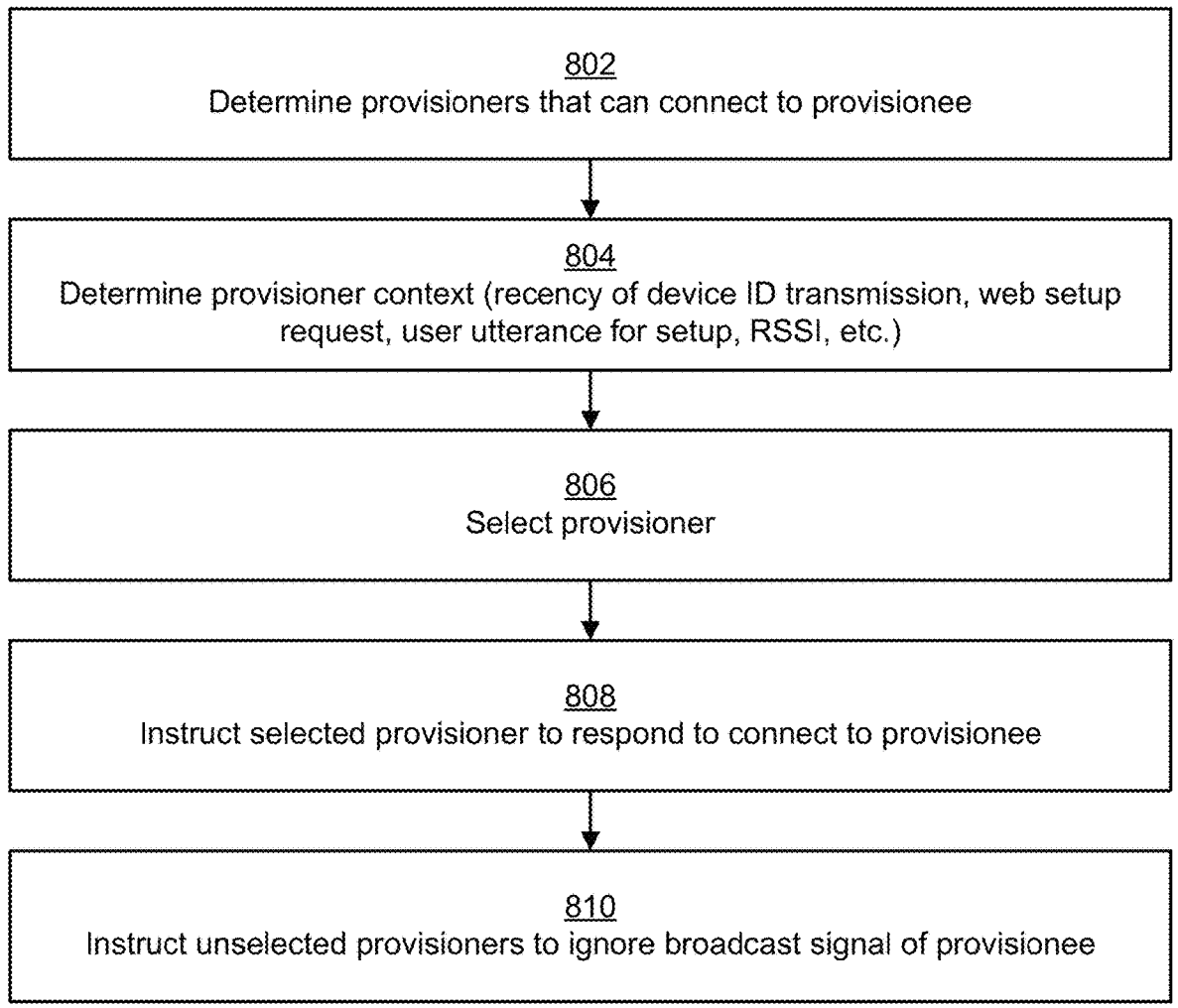
FIG. 8 illustrates an example of a flow for selecting a provisioner, according to embodiments of the present disclosure.

FIG. 8 illustrates an example of a flow for selecting a provisioner, according to embodiments of the present disclosure. In an example, the flow includes operation 802, where the computer system determines provisioners that can connect to a provisionee. The computer system may receive ID data about the provisionee from multiple provisioners, and determine that each of the multiple provisioners can connect to the provisionee.

In an example, the flow includes operation 804, where the computer system determines provisioner context. The provisioner context may include a recency of the device ID transmission, a web setup request, a user utterance for setup, an RSSI, etc. The provisioner context can be sent by the provisioner to the computer system.

In an example, the flow includes operation 806, where the computer system selects a provisioner. The selection may be based on any part of the provisioner context. For example, the computer system may select the provisioner associated with a most recent device ID transmission, a most recent web setup request, a user utterance for setup, or a highest RSSI. Additionally or alternatively, provisioners contexts may be input to an ML model trained to output the selection of the provisioner.

In an example, the flow includes operation 808, where the computer system instructs the selected provisioner to respond to connect to the provisionee. The computer system can send provisioning data to the provisioner with a credential for connecting to an access point of the network that the provisioner is connected to. The provisioner can then send the credential to the provisionee so that the provisionee can join the network.

In an example, the flow includes operation 810, where the computer system instructs the unselected provisioners to ignore the broadcast signal of the provisionee. For example, the computer system instructs an unselected provisioner not to respond to the provisionee's signal broadcast and to check again with the computer system at the end of a time interval for additional updates from the computer system (e.g., to respond to the signal broadcast or to determine that the provisionee has joined the network and no further action is needed).

Figure 9:
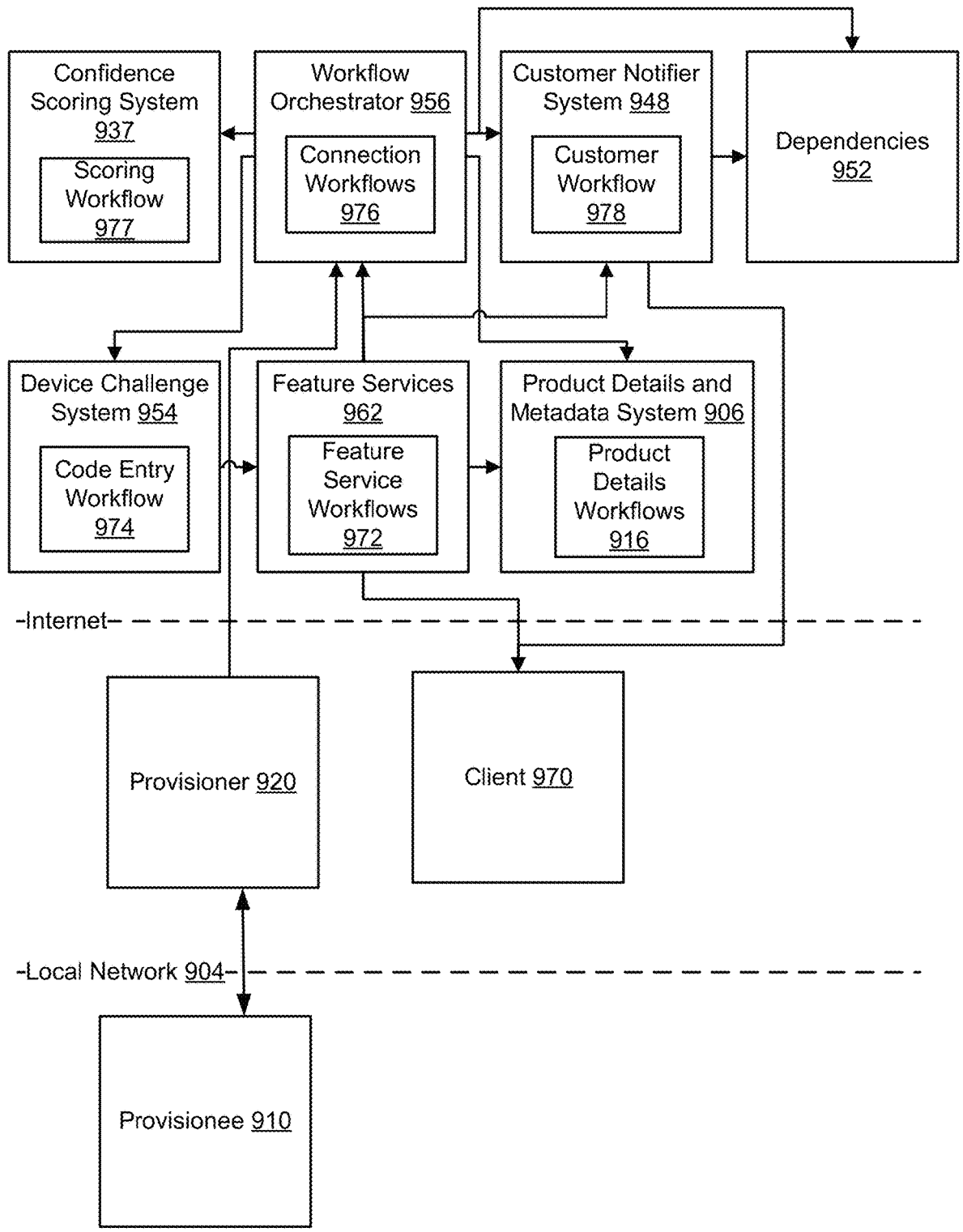
FIG. 9 illustrates an example of a block diagram of components for associating a provisionee with a user account to join a network, according to embodiments of the present disclosure.

FIG. 9 illustrates an example of a block diagram of components for associating a provisionee with a user account to join a network, according to embodiments of the present disclosure. A provisionee 910 can connect to a provisioner 920 to join a local network 904. The provisioner 920 can communicate with a workflow orchestrator 956, which can be part of a computer system (e.g., computer system 130 in FIG. 1) to associate the provisionee 910 with a user account and join the provisionee 910 to the local network 904.

In an example, the workflow orchestrator 956 implements connection workflows (e.g., such as those discussed in the connection stage 203 in FIG. 2) to connect the provisionee 910 to the local network 904. The workflow orchestrator 956 can use feature services 962 and associated feature service workflows 972 to execute the connection workflows 976.

The workflow orchestrator 956 can also access device details and metadata system 906 using device details workflows 916. The device details and metadata system 906 handles various device-level metadata (e.g., device image URL, friendly names, etc.) and can serve device-related capabilities, such as device challenge support. The device details and metadata system 906 additionally stores assets related to the device type and knows whether a device type associated with the provisionee 910 is enable for automated registration.

The workflow orchestrator 956 may make use of a confidence scoring system 937 and a scoring workflow 977 to determine a user account to associate with the provisionee 910. The confidence scoring system 937 may include an ML model (e.g., ML model 137 in FIG. 1) to determine the likelihood of the provisionee 910 being associated with a user account. The confidence scoring system 937 may additionally determine which provisioner is best for setup of the provisionee 910.

The workflow orchestrator 956 can initiate and validate user-challenge requests, if needed, using the device challenge system 954 and a code entry workflow 974. The device challenge system 954 deals with various device challenges, such as a serial number scheme, a one-time password (OTP) scheme, and button press challenge to verify that the provisionee 910 is to be associate with the user account. The device challenge system 954 can store customer provided challenges that can be validate. Additionally, the device challenge system 954 can determine what challenge is best for a given provisionee.

In an example, the workflow orchestrator 956 may also communicate with a customer notifier system 948 that executes a customer workflow 978 to notify a customer of the user account being associated with the provisionee 910 or an action that is to be taken during the setup of the provisionee 910. The customer notifier system 948 can use pre-defined rules to determine where and how to send the notification. The customer notifier system 948 may also be capable of registering or unregistering customer endpoints for applications that do not have push notification mechanisms.

The customer notifier system 948 may additionally communicate with a client 970, which can be a lightweight client-side component that interfaces with the computer system and a client UI. The client 970 can include interfaces between a consumer of a client application and the computer system. For example, an interface can include an interaction involving HTTPS calls to the computer system for polling information or posting user interactions. Another interface may be an interaction from the computer system to push notifications to the application. An application-side component of the client 970 may be woken up by a push message from computer system. The client 970 can also identify an instance of the user account and device on the application and can invoke consumer client facing APIs that renders the UI to be shown to the customer. In addition, the client 970 can include device setup progress APIs showing a progress of setting up the provisionee 910.

One or more of the components may interact with dependencies 952 to perform their associated workflows. The dependencies 952 may provide account linking, credential generation, or any other suitable services to the other components.

Figure 10:
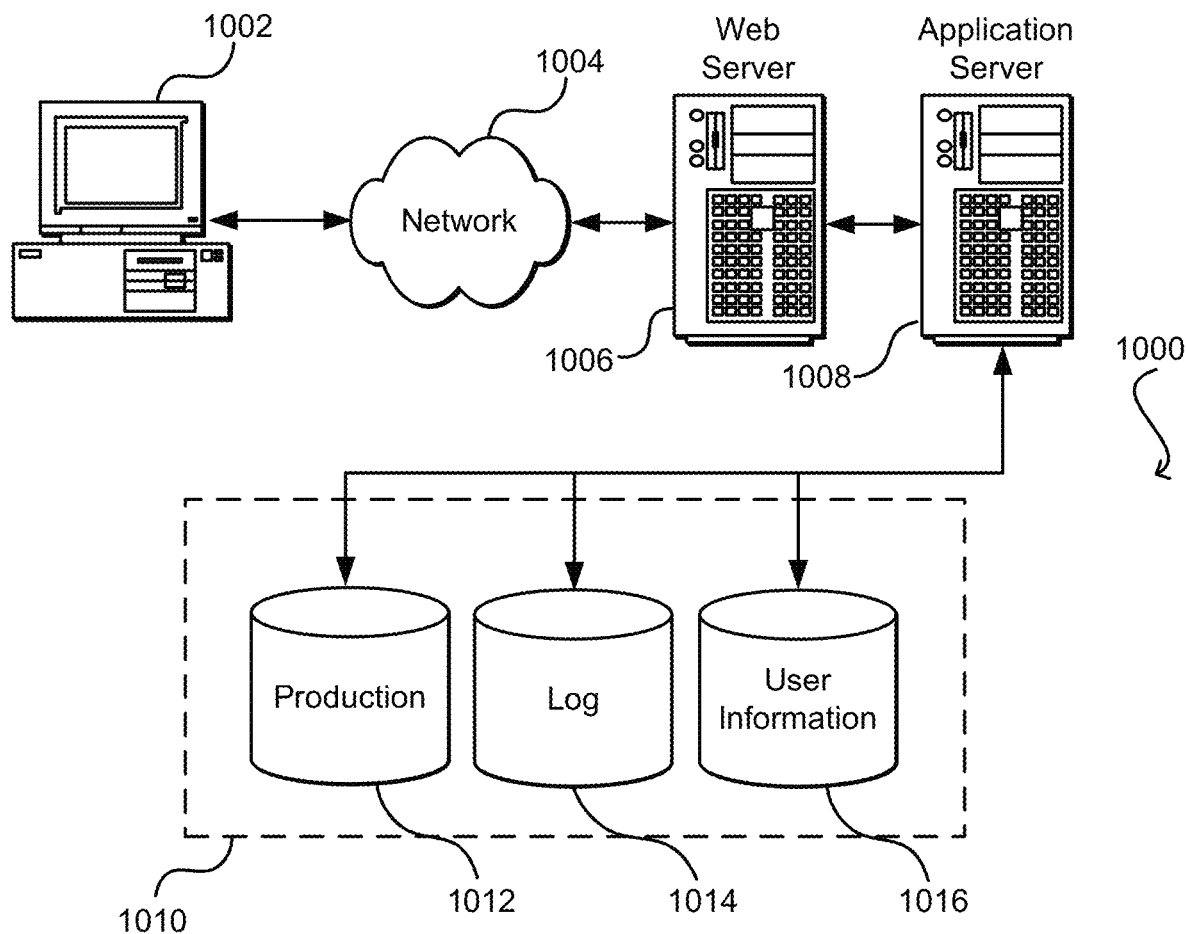
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
a plurality of devices associated with a user account, the plurality of devices comprising an access point of a home network;
a first device unassociated with the user account; and
a computer system comprising one or more processors and one or more memories storing instructions that, upon execution by the one or more processors, configure the computer system to:
receive, from a second device of the plurality of devices, first data indicating an identifier of the first device, the identifier sent from the first device to the second device in a BLUETOOTH advertisement beacon, the first data further indicating a received signal strength indication (RSSI) of the BLUETOOTH advertisement beacon;
determine that the identifier is unassociated with any user account accessible to the computer system;
determine second data indicating at least one of: an access to the user account, a request for a device setup page from a first application executed on one of the plurality of devices, a determination of a device setup intent based on user utterance audio received by the one of the plurality of devices, a device purchase associated with the user account, a device shipment associated with the user account, or a device delivery associated with the user account;
generate, by at least using an input to a machine learning (ML), an indication that the first device is to be associated with the user account, the input comprising the first data and the second data;
send, to a third device of the plurality of devices, third data that causes the third device to output a confirmation request about setting up the first device, the third device being the same or different from the second device;
receive, from the third device, fourth data indicating a response confirming the setting up of the first device;
associate the first device with the user account by at least including the identifier in information of the user account; and
send, to the second device, fifth data indicating a credential of the access point and that the second device is to provide the credential to the first device, wherein the first device connects to the access point and joins the home network based on the credential.

2. The system of claim 1, wherein the one or more memories store further instructions that, upon execution by the one or more processors, configure the computer system to:
send, to a fourth device of the plurality of devices, sixth data that causes the fourth device to present the confirmation request in a graphical user interface;
cause the third device to present the confirmation request in a voice user interface, wherein the fourth data is received based on input at the voice user interface; and
cause, the third device instead of the fourth device, to present at the voice user interface an indication that the first device is being set up and that a second application is available for download on the fourth device.

3. The system of claim 1, wherein the one or more memories store further instructions that, upon execution by the one or more processors, configure the computer system to:
send, to the third device, sixth data that causes the third device to output a notification about downloading a second application, wherein the second application is associated with a computing service of the first device;
receive, from the third device, seventh data indicating that an application download is requested; and
cause a download of an instance of the second application to a fourth device of the plurality of devices, wherein the fourth device is the same or different from the third device, wherein the instance is configured based on information from the user account.

4. The system of claim 1, wherein the one or more memories store further instructions that, upon execution by the one or more processors, configure the computer system to:
  determine a type of the first device by looking up, based on the identifier, metadata from a manufacturer of the first device, wherein the type of the first device is associated with a code entry for proceeding with the setting up of the first device;
  send, to the third device, sixth data that causes the third device to output a notification about an entry of a code associated with the first device;
  receive, from the third device, seventh data indicating the code; and
  determine a match between the code and the metadata.

5. A computer-implemented method, comprising:
  receiving first data indicating an identifier of a first device, the first data received from a second device, the second device associated with an account and connected to a data network;
  determining that the identifier is unassociated with a plurality of accounts, the plurality of accounts comprising the account;
  determining second data associated with at least one of the identifier, access to the account, or a device setup request;
  determining, based at least in part on the first data and the second data, that the first device is to be associated with the account;
  sending, to a third device, third data that causes the third device to output a confirmation request about setting up the first device, the third device being the same or different from the second device;
  receiving, from the third device, fourth data indicating a response to the confirmation request; and
  associating the first device with the account based at least in part on the fourth data.

6. The computer-implemented method of claim 5, further comprising:
  sending, to the second device, fifth data indicating a credential associated with the data network and that the second device is to provide the credential to the first device; and
  receiving, from the first device or the second device, sixth data indicating that the first device is connected to the data network.

7. The computer-implemented method of claim 5, wherein the account is a first account, and wherein the method further comprises:
  receiving, from a fourth device, fifth data indicating the identifier of the first device, the fourth device associated with a second account and connected to a different data network; and
  determining, based at least in part on the second data, that the first account is to be selected instead of the second account for an association with the first device, wherein the second data indicates at least one of: a signal strength indication (RSSI) of a signal broadcast that is received by the second device from the first device and that encodes the identifier, a request for a device setup page from an application associated with the first account, or a determination of a device setup intent based on user utterance audio associated with the first account.

8. The computer-implemented method of claim 7, further comprising:
  sending, to the second device, sixth data causing the second device to connect to the first device, wherein the first data is received from the second device based at least in part on the signal broadcast from the first device; and
  sending, to the fourth device, seventh data indicating that the fourth device is to ignore the signal broadcast, wherein the fifth data is received from the fourth device based at least in part on the signal broadcast from the first device.

9. The computer-implemented method of claim 5, further comprising:
  receiving, from a fourth device, fifth data indicating the identifier of the first device, the fourth device associated with the account and connected to the data network;
  determining that a timing of the fifth data indicates that the fifth data is received after the first data is received; and
  sending, to the fourth device instead of the second device, sixth data causing the fourth device to connect to the first device, the sixth data sent based at least in part on the timing of the fifth data.

10. The computer-implemented method of claim 5, further comprising:
  receiving, from a fourth device, fifth data indicating the identifier of the first device and a signal strength indication (RSSI) of a signal broadcast that is received by the fourth device from the first device and that encodes the identifier, the fourth device associated with the account and connected to the data network, the fifth data received after the first data is received;
  determining that the RSSI is larger than that indicated by the first data; and
  sending, to the fourth device instead of the second device, sixth data causing the fourth device to connect to the first device, the sixth data sent based at least in part on the RSSI.

11. The computer-implemented method of claim 5, further comprising:
  determining a plurality of devices that are associated with the account;
  determining that the third device of the plurality of devices has a voice user interface capability, wherein the third data is sent to the third device based at least in part on the voice user interface capability;
  determining that a fourth device of the plurality of devices has a graphical user interface capability; and
  sending, to the fourth device, fifth data that causes the fourth device to output the confirmation request about setting up the first device, the fifth data sent based at least in part on the graphical user interface capability.

12. The computer-implemented method of claim 5, further comprising:
  determining a plurality of devices that are associated with the account; and
  determining that the third device is one of the plurality of devices and is associated with a most recent access to the account among remaining ones of the plurality of devices, wherein the third data is sent to the third device based at least in part on the most recent access.

13. The computer-implemented method of claim 5, further comprising:
  determining a plurality of devices that are associated with the account; and
  determining that the second data indicates a request from the third device for a device setup page, or a determination of a device setup intent based on user utterance audio received by the third device, wherein the third data is sent to the third device based at least in part on the second data.

14. A computer system comprising:
one or more processors; and
one or more memories storing instructions that, upon execution by the one or more processors, configure the computer system to:
receive first data indicating an identifier of a first device, the first data received from a second device, the second device associated with an account and connected to a data network;
determine that the identifier is unassociated with a plurality of accounts, the plurality of accounts comprising the account;
determine second data associated with at least one of the identifier, access to the account, or a device setup request;
determine, based at least in part on the first data and the second data, that the first device is to be associated with the account;
send, to a third device, third data that causes the third device to output a confirmation request about setting up the first device, the third device being the same or different from the second device;
receive, from the third device, fourth data indicating a response to the confirmation request; and
associate the first device with the account based at least in part on the fourth data.

15. The computer system of claim 14, wherein the account is a first account, and wherein the one or more memories store instructions that, upon execution by the one or more processors, configure the computer system to:
determine that the identifier is received from a first plurality of devices associated with the first account and from a second plurality of devices associated with a second account;
determine that a total number of the first plurality of devices is larger than that of the second plurality of devices; and
determine that the first device is to be associated with the first account instead of the second account based at least in part on the total number.

16. The computer system of claim 14, wherein the first data is received at a first time, wherein the second data is received at a second time, and wherein the one or more memories store instructions that, upon execution by the one or more processors, configure the computer system to:
generate, prior to the second time, a likelihood of the first device being associated with the account based at least in part on the first data; and
generate, after the second time, an updated likelihood by updating the likelihood based at least in part on the second data, wherein the determination to associate the first device with the account is based at least in part on the updated likelihood.

17. The computer system of claim 14, wherein the one or more memories store instructions that, upon execution by the one or more processors, configure the computer system to:
determine a plurality of devices that are associated with the account;
determine that the first device is associated with an application; and
determine that the third device is one of the plurality of devices and stores an instance of the application, wherein the third data is sent to the third device based at least in part on the instance.

18. The computer system of claim 14, wherein the one or more memories store instructions that, upon execution by the one or more processors, configure the computer system to:
determine a plurality of devices that are associated with the account;
determine that the third device of the plurality of devices has a voice user interface capability;
determine that a fourth device of the plurality of devices has also the voice user interface capability; and
determine that a signal strength indication (RSSI) indicated by the first data is larger than that indicated by the fourth device, wherein the third data is sent to the third device instead of the fourth device based at least in part on the voice user interface capability and the RSSI.

19. The computer system of claim 14, wherein the one or more memories store instructions that, upon execution by the one or more processors, configure the computer system to:
generate a likelihood of the first device being associated with the account based at least in part on the first data or the second data; and
determine a trigger for requesting a code entry to proceed with connecting the first device to the data network, the trigger comprising at least one of the likelihood or a type of the first device.

20. The computer system of claim 19, wherein the one or more memories store instructions that, upon execution by the one or more processors, configure the computer system to:
send, to a fourth device, fifth data that causes the fourth device to output a notification about an entry of a code associated with the first device, the fourth device being one of the second device or the third device, the code being a predefined code or being a dynamic code that is generated by the computer system and sent to a fifth device, the fifth device being the other one of the second device or the third device;
receive, from the fourth device, sixth data indicating the code; and
send, to the second device, seventh data indicating that the second device is to connect to the first device.

* * * * *